June 5, 1923. Re. 15,618
T. R. DUGGAN
METHOD OF AND APPARATUS FOR SOFTENING WATER
Original Filed Oct. 23, 1916
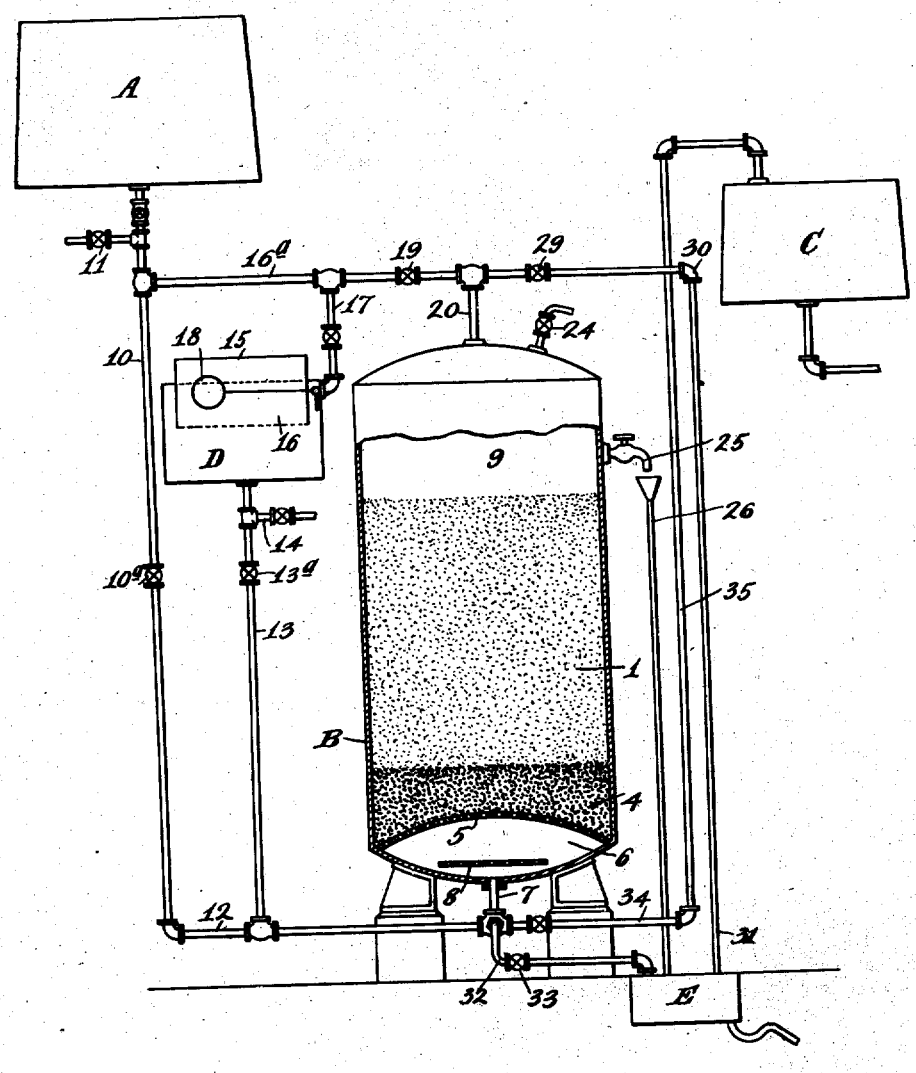
Thomas R. Duggan
Inventor:
by his Atty O. R. McElroy Reissued June 5, 1923. Re. 15,618

UNITED STATES PATENT OFFICE.

THOMAS R. DUGGAN, OF NEW YORK, N. Y., ASSIGNOR TO THE PERMUTIT COMPANY, OF NEW YORK, N. Y., A CORPORATION OF DELAWARE.

METHOD OF AND APPARATUS FOR SOFTENING WATER.

Original No. 1,276,629, dated August 20, 1918, Serial No. 127,127, filed October 23, 1916. Application for reissue filed April 22, 1922. Serial No. 556,137.

*To all whom it may concern:*

Be it known that I, THOMAS R. DUGGAN, a citizen of Great Britain, residing at New York, in the county of New York and State of New York, have invented certain new and useful Improvements in Methods of and Apparatus for Softening Water, of which the following is a specification.

This invention relates to methods of and apparatus for softening water; and it comprises a method of utilizing the activity of exchange silicates to a greater extent than is now the case and of quickly revivifying the same with good utilization of revivifying solutions; and it also comprises certain apparatus with connections adapted for the performance of this method; all as more fully hereinafter set forth and as claimed.

In the method of softening water by the use of exchange silicates which is now well known, water to be softened is passed through certain materials containing silica and alumina (or another amphoteric oxid, such as titanium oxid, iron oxid, chromium oxid, tin oxid, zinc oxid, etc.), alkali and water. These materials are used in the form of small hard granules which are employed as a granular bed.

On the passage of hard water through the bed of granules the lime and magnesia compounds, to which the water owes its hardness, are taken up by the exchange silicate, alkali compounds going into solution in their lieu. After a period of use when the exchange silicate has taken up a certain amount of lime and magnesia, it is revivified by passing a solution of sodium chlorid (common salt) through the bed. The lime and magnesia now go into solution as calcium and magnesium chlorids and the exchange silicate takes up alkali again so that it is ready for re-use.

I find certain advantages are gained by an upward flow of salt solution in the regenerating phase. With the relatively heavy salt solution passing in an upward direction the relative movement of the granules with regard to each other is more pronounced than it is with a similar flow of water; and uniform passage of the salt solution takes place.

In revivification, it is found that the main part of the absorbed bases will be removed by the salt solution after the regenerating liquid has been supplied to and passed through the layer in an amount equal to or larger than that amount of liquid which can be stored in the spaces between the granules. Or, in other words, the liquid occurring between the granules must be displaced once or twice by the salt solution in order to remove the main part of the bases absorbed by the exchange silicate. Repassage of the used salt solution through the bed does little good and may do harm, since such a solution will only take up a certain amount of calcium or magnesium before losing regenerating power. When in softening the water flows downward and the salt solution passes upward, the lower layers of silicates are completely revived first and it is inexpedient to bring back contaminated brine into contact therewith again. It is desirable in regeneration to bring the clean or uncontaminated salt solution first into contact with the most active or least contaminated layers of silicates.

After the revivifying solution has been used on the exchange silicate, such solution must, as already stated, be removed to prevent the contamination of the water next to be treated. In one way, giving a good utilization of the salt solution, I can, after admitting the salt solution to the bed, gradually admit fresh water at the bottom of the bed, drawing off from a point above; the admission of water being finally stopped and the residual liquid in the bed then removed by draining from the bottom. It is advantageous to choose the amount of water in which the regenerating salt is dissolved, so that the main part of the absorbed bases is taken into solution and taken away before fresh water is introduced. Other ways of removing the salt solution than that indicated may be used; but the described way is economical and practical, since the whole amount of regenerating liquid is well utilized; but any other suitable way may be used. Care should however be taken that repassage of contaminated salt solution through the revived or partially revived bed is avoided.

In the accompanying illustration I have shown, more or less diagrammatically certain embodiments of apparatus within the present invention and susceptible of use in the described process.

The figure illustrates a view of a structure wherein the flow of water to be softened is normally downward while that of the regenerating solution is upward.

In the structure, element A, is a tank, pipe or other source of water to be softened and treated, while D is a tank, pipe or other source of salt solution. B is a casing for containing the bed of exchange silicates and C is a pipe, tank or other arrangement for removing or receiving softened water. E is a diagrammatically shown sewer connection.

Casing B contains a layer or bed 1 of exchange silicates. The granular silicates may rest on a gravel layer 4, or the gravel layer may be dispensed with. Cross-plate 5 may be replaced by a strainer system or any other suitable structure. Below this cross-plate is open chamber 6 with pipe connection 7 at its lowest point. Baffle 8 is arranged above this pipe connection in order to give an even distribution of the liquid. Above the bed is an empty chamber 9. Leading from tank A is water pipe 10 provided with valve 10ª. Valved inlet 11 may be used in lieu of tank A as a source of water to be softened. This pipe 10 extends downwardly to a cross-connection 12 communicating with the casing B at the lowest point. Leading from this cross-connection is another valved pipe 13 leading to tank D for salt solution. In lieu of tank D, salt solution may be brought from another source through valved inlet 14. As shown, tank D is provided with a salt box 15 having perforated bottom 16. Also leading from the water supply pipe is another cross pipe 16ª provided with valved outlet pipe 17 leading to the tank D for salt solution. As shown, this pipe is also provided with a float valve 18. Beyond this valved outlet pipe 17 in the upper cross pipe is valve 19 and beyond this again is a down pipe 20 leading into the top of casing B.

The upper cross pipe is further provided with a valve 29 beyond which it extends to special connection 30 and 31 leading down to the sewer connection E, thus affording a discharge for the back wash water. The lower cross pipe 12 has a connection entering the bottom of the casing B but at this point it has another connection 32 leading past valve 33 to the sewer connection E. Another valved connection 34 leads through pipe 35 to tank C for softened water.

In the operation of this structure, presuming the exchange silicate to be regenerated and ready for operation, water from 11 or A passes through 16ª and 20, valve 19 being open, into chamber 9, and thence through the silicate bed 1 downward to 7. From 7 the softened water passes through 34 and 35 to C. When the exchange silicate needs regeneration, the flow of water through the apparatus is stopped and the valve in 17 is opened, box 15 being supplied with the requisite amount of salt. An amount of water controlled by float valve 18 enters D and dissolves the salt in the salt box. Brine from another source may of course be supplied through pipe 14. The salt solution passes downward through 13 (valves 10ª and 19 being closed) and into the bottom of the casing B through 7. The salt solution passes upward through silicates 1 to the draw-off cock 25 and thence through 26 to waste.

In flushing out the brine water may of course be sent through the salt line shown coming through line 16ª and pipe 17 past valve 18 into D and thence downwardly through 13, past valve 13ª into the bottom of the casing B through pipe 7. In so doing, a simple manner of operation is afforded since the necessary quantity of salt may be put into box 15 and then the water allowed to flow. The water at first forms the salt solution necessary for reviving and then passes this salt solution upwardly through the silicates to waste at 25 and then washes the whole apparatus. Or valve 24 may be opened to allow air to enter, valve 10ª closed and valve 33 opened allowing the liquid in the bed to flow downward through the mass and go to exit at 7 and 32. It will be noted that 7 communicates with B at the lowest portion of the casing so as to insure a positive draining with removal of all water containing salt. If desired, the valve 24 being closed, 19 may be opened and a supply of fresh water sent through the mass downwardly for washing purposes. The exchange silicate being now revived and washed is ready for another water softening phase as before.

With an operation such as that described, the dissolved impurities in the water to which it owes its hardness (lime or magnesia or both) mainly accumulate in the face of the bed at which the water enters, the top face. On now passing salt solution through from the opposite face, this salt solution, which is of course, substantially free of lime and magnesia, passes first through the little contaminated portion of the bed and then into contact with the contaminated portion, there taking up the lime and magnesia. As the flow continues, the dissolved lime and magnesia are carried away from the bed and do not reenter it.

What I claim is:

1. In the purification and softening of water, the process which comprises transmitting water downwardly through a granular bed of exchange silicates until such silicates have functioned to a sufficient degree, thereupon passing salt solution followed by wash water through such bed in an upward direction with removal of salt solution and wash water at or above the upper face of such bed until the silicates are regenerated, interrupting the flow at this time and draining the bed from the lowest point, and once more passing water to be softened through the bed in a downward direction.

2. In a water softening apparatus, a casing, a bed of exchange silicates therein, means for transmitting water to be softened through such bed and means for passing salt solution through the bed upwardly to a point of outlet above such bed, means for washing out the salt solution and means connected to the lowest point of the casing leading to a place of disposition for removing the water used in such washing out.

In testimony whereof I affix my signature.

THOMAS R. DUGGAN.